UNITED STATES PATENT OFFICE.

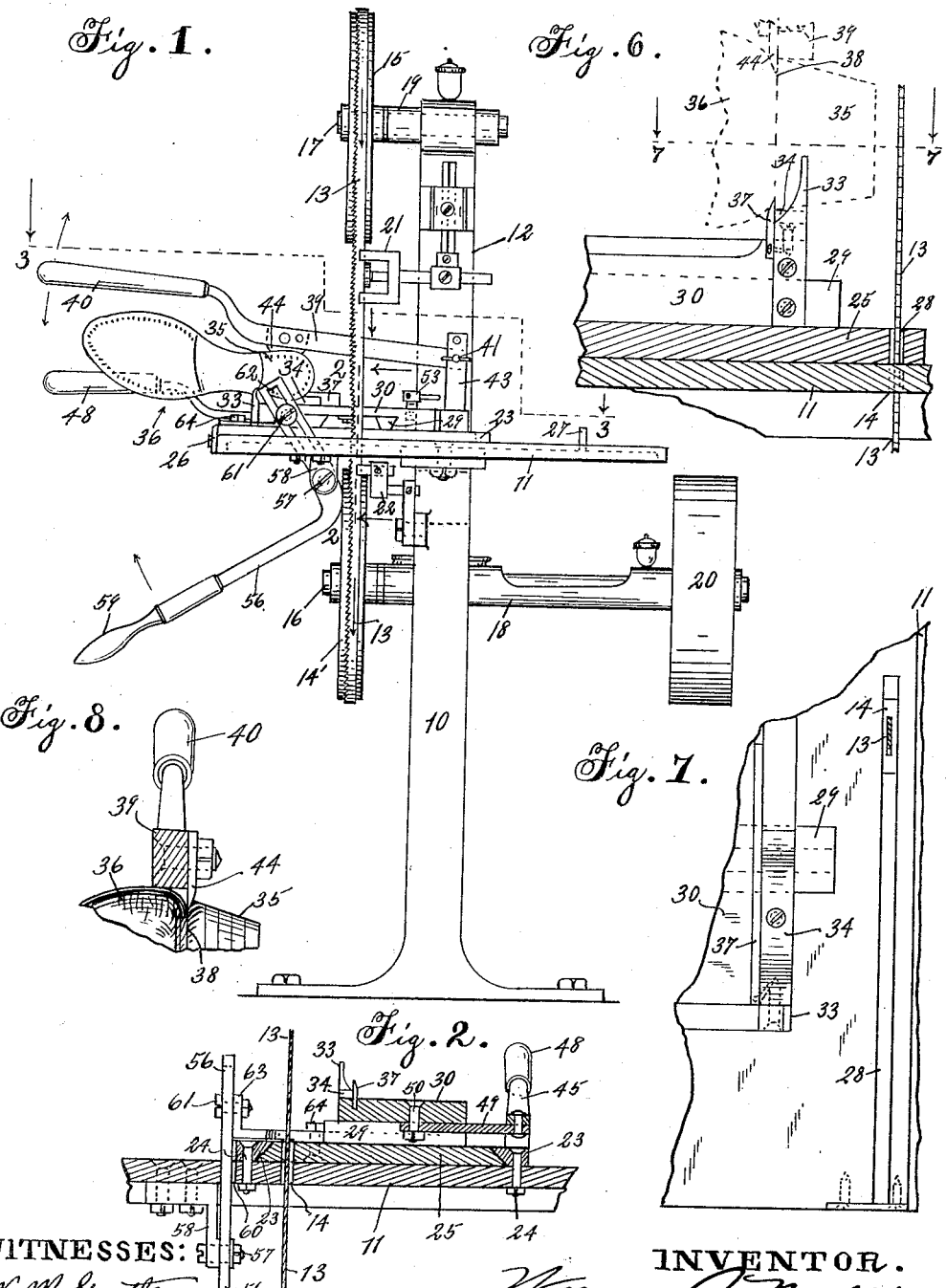

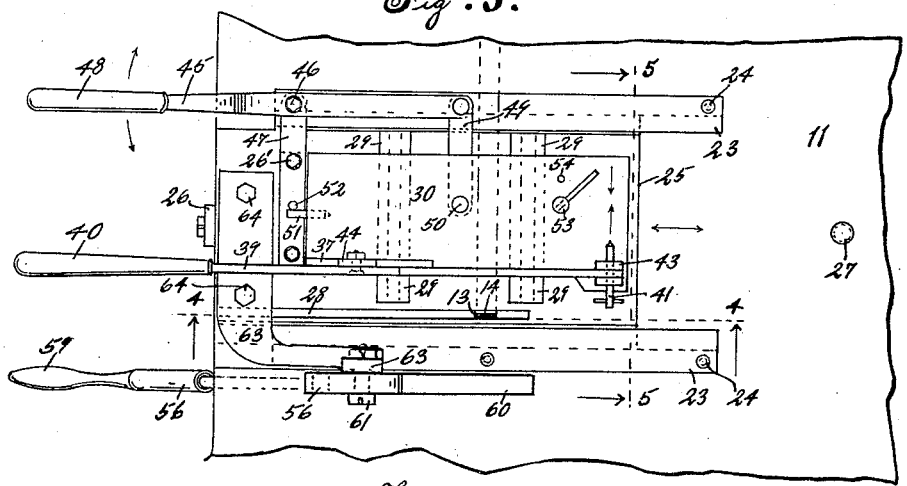
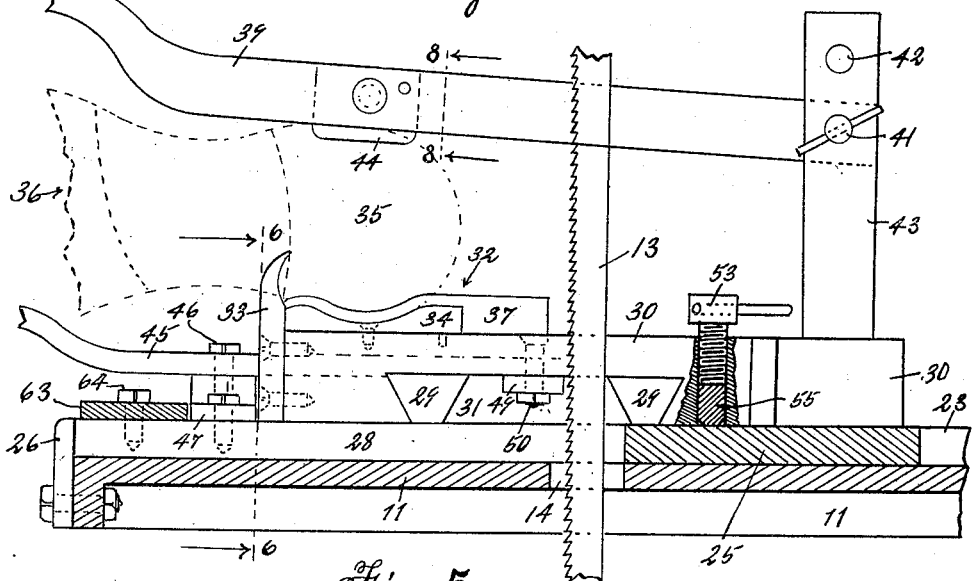
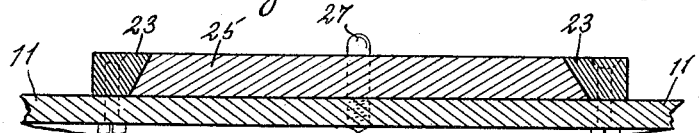

WILLIAM J. NESBITT, OF LOS ANGELES, CALIFORNIA.

HEEL-CUTTING APPARATUS.

1,109,136. Specification of Letters Patent. Patented Sept. 1, 1914.

Application filed October 4, 1913. Serial No. 793,476.

*To all whom it may concern:*

Be it known that I, WILLIAM J. NESBITT, a citizen of the United States of America, residing at Los Angeles, county of Los Angeles, State of California, have invented a certain new and useful Heel-Cutting Apparatus; and I do hereby declare the following to be a full, clear, and exact description of the invention, such as will enable others skilled in the art to which it appertains to make and use the same.

This invention relates to heel cutting apparatus, and it may be said to consist in the provision of the novel and advantageous features and in the novel and improved construction, arrangement, and combination of parts and devices as will be apparent from the description and claims which follow hereinafter.

One object of the invention is to provide novel and improved apparatus whereby the cutting away of worn parts of heels of shoes may be easily and quickly effected.

Another object of the invention is to provide novel and improved means for holding the shoe and moving it to and from operative relation with a saw for cutting away the heel of the shoe.

Further objects of the invention are to provide novel and improved apparatus of the class specified, which is simple in construction, easy to manipulate, convenient to use, works rapidly and smoothly, and which is effective in action.

Other objects and the advantages of the invention will be apparent to those skilled in the art from a consideration of the following description of the preferred form of construction embodying it, taken in connection with the accompanying drawings in which—

Figure 1 is a side elevational view of the apparatus; Fig. 2 is an enlarged broken and sectional view taken on the line 2—2 of Fig. 1; Fig. 3 is an enlarged broken plan view taken on the line 3—3 of Fig. 1; Fig. 4 is an enlarged broken and sectional view taken on the line 4—4 of Fig. 3; Fig. 5 is an enlarged broken and sectional view taken on the line 5—5 of Fig. 3; Fig. 6 is a broken and sectional view taken on the line 6—6 of Fig. 4; Fig. 7 is a broken and sectional plan view taken on the line 7—7 of Fig. 6; and Fig. 8 is a sectional view taken on the line 8—8 of Fig. 4 and showing the clamping lever and blade thereon in engagement with the shoe.

The pillar 10 has thereon the platform 11 and the post 12 which latter extends upwardly above the platform at one side of the platform. A band saw 13 passes through a slot 14 in the platform 11 and around wheels 14′ and 15 on shafts 16 and 17 which are respectively mounted in suitable bearings 18 and 19 on the pillar 10 and post 12—the shaft 16 having thereon a driving pulley 20. The band saw 13 may be guided and held in position by any suitable or approved devices; those indicated at 21 and 22 being of the usual form need not be described in detail here.

Between guide bars 23 extending longitudinally of the platform 11 and secured to the platform by bolts 24 is slidably arranged a table 25 the forward movement of which table is limited by a stop 26 suitably secured to the platform and the rearward movement of which table is limited by a stop 27 secured to the platform. The table 25 is provided with a slot 28 providing a free path for the saw 13 when the table is operated, and it is also provided with guide bars 29 extending transversely and having slidably mounted thereon the table 30 which has a cutaway portion 31 on the underside thereof.

The means for holding a shoe on the table 30 and for adjusting said table will now be described.

At the forward end of the side portion of the table 30 adjacent to the band saw 13 is stationarily mounted a heel rest 32 and an abutment 33 which contacts with the forward part of the heel when the latter is placed on the heel rest and moved against the saw 13. The heel rest 32 preferably consists of a curved block 34 which is suitably secured to the table 30 and on which the side of the heel 35 of a shoe 36 bears, and an edged blade 37 disposed at the side of the block 34 and having a curved part thereof adapted to fit in the hollow 38 between the heel 35 and the insole or upper leather of the shoe to hold the heel against lateral displacement. A lever 39, having a handle 40 on its forward end and having its rear end pivotally mounted on a pin 41 adapted to fit through any of a series of openings 42 and in a bifurcated standard 43 on the rear part of table 30, has thereon an edged blade 44 adapted to fit in the hollow between the heel 35 and the insole or upper leather of the shoe so that when the heel is placed on the heel rest 32 the lever 39 may be moved downwardly and held to clamp the heel in position. The table 30 may be moved toward or away from the saw 13 by swinging lever 45 which is mounted on pivot 46 on an arm 47 secured to the table 25 by screws 26' and which has a handle 48 on its forward end and has its rear end pivotally connected with one end of link 49 which latter extends into the cutaway portion 31 and is pivotally connected with the table 30 by means of a bolt 50. A stop 51 on the table 30 is adapted to engage with a stop 52 carried on the table 25 to limit movement of the table 30 away from the saw 13. By swinging the lever 45 to the left the table 30 is moved to bring the heel of the shoe into the path of the saw 13 for cutting away the worn out part of the heel, whereupon the screw 53 in the table 30 is turned to the right from the stop 54 to have its lower end bear against a block 55 loosely disposed in an opening in the table 30 below the screw 53 and thereby raise the table 30 into frictional engagement with the guide bars 29 to lock the table 30 in adjusted position on the table 25. When the lever 39 is held down to clamp the heel of the shoe on the heel rest 32, the angular lever 56 is moved upwardly to operate the table 25 and thereby cause movement of the heel past the saw 13 to cut away a part of the heel. The lever 56 is mounted on a pivot 57 on the lug 58 on the underside of the platform 11, and has a handle 59 on its forward end. The rear end portion of the angular lever 56 passes through a slot 60 in the platform 11 and is connected with the table 25 by means of a bolt 61 passing freely through a slot 62 in the angular lever 56 and secured to the upwardly extending portion of an arm 63 which latter is secured to the forward part of the table 25 by means of bolts 64.

While one form of construction embodying the invention has been particularly illustrated and described, many changes and modifications thereof will occur to those skilled in the art, wherefore the right is reserved to all such changes and modifications as do not depart from the spirit and scope of the invention as defined by the appended claims.

I claim:

1. Improved apparatus of the class specified, comprising a pillar, a platform and a post on the pillar, shafts mounted on the pillar and post, wheels on the shafts, a table mounted on the platform and movable longitudinally thereof, a band saw on said wheels, a second table mounted on and movable transversely of the first table, means for holding a shoe on the second table, and means to operate the first table to move the heel of the shoe past the band saw to cut away a part of the heel, substantially as described.

2. In apparatus of the class specified, the combination of a platform, a table mounted on the platform and movable longitudinally thereof, a band saw at one side of the table, a second table adjustably mounted on the first table, a heel rest on the second table, including a curved block and a curved blade disposed on the side of the block remote from the band saw, means for holding the heel of a shoe clamped in position against the heel rest, and means to operate the first table to move the heel past the band saw to cut away a part of the heel, substantially as described.

3. Improved apparatus of the class specified, comprising a pillar, a platform and a post on the pillar, shafts mounted on the pillar and post, wheels on the shafts, a table movably mounted on the platform, a band saw on said wheels, a second table adjustably mounted on the first table, means for holding a shoe on the second table, means for locking the second table in adjusted position, and means to operate the first table to move the heel of the shoe past the band saw to cut away a part of the heel.

4. In apparatus of the class specified, the combination of a table, a heel rest including a curved block resting on the table and a curved blade disposed on the side of the block, a standard on said table, and a lever pivotally mounted on said standard and having thereon a plate adapted to fit in the hollow between the heel and insole or upper leather of a shoe for holding the heel clamped against the heel rest, substantially as described.

In testimony whereof, I have signed my name to this specification in the presence of two subscribing witnesses at Los Angeles, county of Los Angeles, State of California, this 29th day of September A. D. 1913.

WILLIAM J. NESBITT.

Witnesses:
A. H. LIDDERS,
ELLA SCOTT.

---

Copies of this patent may be obtained for five cents each, by addressing the "Commissioner of Patents, Washington, D. C."